US007631914B2

(12) United States Patent
Curley

(10) Patent No.: US 7,631,914 B2
(45) Date of Patent: Dec. 15, 2009

(54) ADJUSTABLE GRIPPER PAD WITH ECCENTRIC BORE

(75) Inventor: Richard Daniel Curley, Dover, NH (US)

(73) Assignee: Goss International Americas, Inc., Durham, NH (US)

( * ) Notice: Subject to any disclaimer, the term of this patent is extended or adjusted under 35 U.S.C. 154(b) by 0 days.

(21) Appl. No.: 11/483,863

(22) Filed: Jul. 10, 2006

(65) Prior Publication Data

US 2008/0007076 A1 Jan. 10, 2008

(51) Int. Cl.
*B65G 47/90* (2006.01)
*B65G 47/52* (2006.01)

(52) U.S. Cl. ....................... 294/106; 294/116; 294/902; 198/803.7; 198/803.9

(58) Field of Classification Search ................ 294/86.4, 294/101, 106, 114, 116, 902; 269/266, 267, 269/279; 271/21; 198/803.7, 803.9
See application file for complete search history.

(56) References Cited

U.S. PATENT DOCUMENTS 1,807,360 A * 5/1931 Wehr .......................... 294/106
2,229,800 A * 1/1941 Dean .......................... 294/106
3,023,878 A * 3/1962 Forsthoff et al. ............ 198/354
3,239,263 A * 3/1966 Farmer et. al. ............. 294/19.1
3,771,826 A * 11/1973 Merola ........................ 294/114
4,196,835 A 4/1980 Schlough ..................... 227/81
4,482,141 A 11/1984 Moser ......................... 270/54
4,623,561 A * 11/1986 Groothuizen ............... 427/275
4,834,442 A * 5/1989 Choung ....................... 294/101
5,303,910 A * 4/1994 McGill et al. ................. 271/21
5,884,951 A * 3/1999 Long et al. ................. 294/86.4
6,189,302 B1 * 2/2001 Kudo et al. ................... 53/556
6,577,382 B2 * 6/2003 Kida et al. .................... 355/77
6,616,139 B2 9/2003 Aesch ........................ 271/204
6,705,607 B2 * 3/2004 Eugster ...................... 271/204
6,715,811 B2 * 4/2004 Nordstrom et al. .......... 294/106
6,830,242 B2 * 12/2004 Merkli .................... 270/52.29
6,918,735 B2 * 7/2005 Urban et al. ................ 414/729
2005/0225023 A1 10/2005 Schlough ..................... 271/69

* cited by examiner

*Primary Examiner*—Dean J Kramer
(74) *Attorney, Agent, or Firm*—Davidson, Davidson & Kappel, LLC

(57) ABSTRACT

A device for gripping products including a first gripper arm having a first gripper pad, and a second gripper arm having a second gripper pad, the first gripper pad having a bore and an outer surface being eccentric with respect to the bore. A method is also provided.

11 Claims, 4 Drawing Sheets

ADJUSTABLE GRIPPER PAD WITH ECCENTRIC BORE

BACKGROUND

The present invention relates generally to bookbinding machines and material handling machinery and more particularly to a device for transporting printed products.

U.S. Pat. No. 4,196,835, hereby incorporated by reference herein, discloses an improved collating machine which includes a stitcher assembly which stitches a group of signatures while they are moving. A saddle conveyor travels past a collating station and individual signatures are fed from the collating station onto the conveyor to form the group of collated signatures. The conveyor carries the group of collated signatures through the stitcher assembly which binds the signatures in each group together U.S. Pat. No. 4,482,141 discloses a method and device for conveying signatures from a blade chain conveyor supporting the signatures directly at a fold line. The signatures are gripped from above by orbitally-rotating clamping pads, which then transfer the signatures to a belt conveyor perpendicular to the blade chain conveyor.

U.S. Pat. No. 6,616,139 discloses a device for removing printed products, having a fold and being transported uniformly spaced and astraddle by a transport device, has a rotatingly driven gripping device with controlled gripping elements for gripping one of the printed products by the fold on the transport device and removing the printed product while stably holding the printed product.

BRIEF SUMMARY OF THE INVENTION

The inability to adjust gripper pads causes uneven wear and prevents the pressure of the gripper pads on products from being adjusted.

The present invention provides a device for gripping products including a first gripper arm having a first gripper pad and a second gripper arm having a second gripper pad, the first gripper pad having a bore and an outer surface being eccentric with respect to the bore.

By advantageously providing gripper pads with an eccentric bore, the gripper pads can be adjusted to increase the clamping force of the gripper as product thickness increases and adjusted to accommodate unbalanced product thickness. In addition, gripper pads may be rotated to provide for even wear.

The present invention also provides a method including the steps of:

moving a first gripper arm having a first gripper pad;

moving a second gripper arm having a second gripper pad; and adjusting a contact point of the first gripper pad with the printed product by rotating the first gripper pad with respect to the first gripper arm.

BRIEF DESCRIPTION OF THE DRAWINGS

A preferred embodiment of the present invention will be elucidated with reference to the drawings, in which.

DETAILED DESCRIPTION OF A PREFERRED EMBODIMENT

Figure 1:
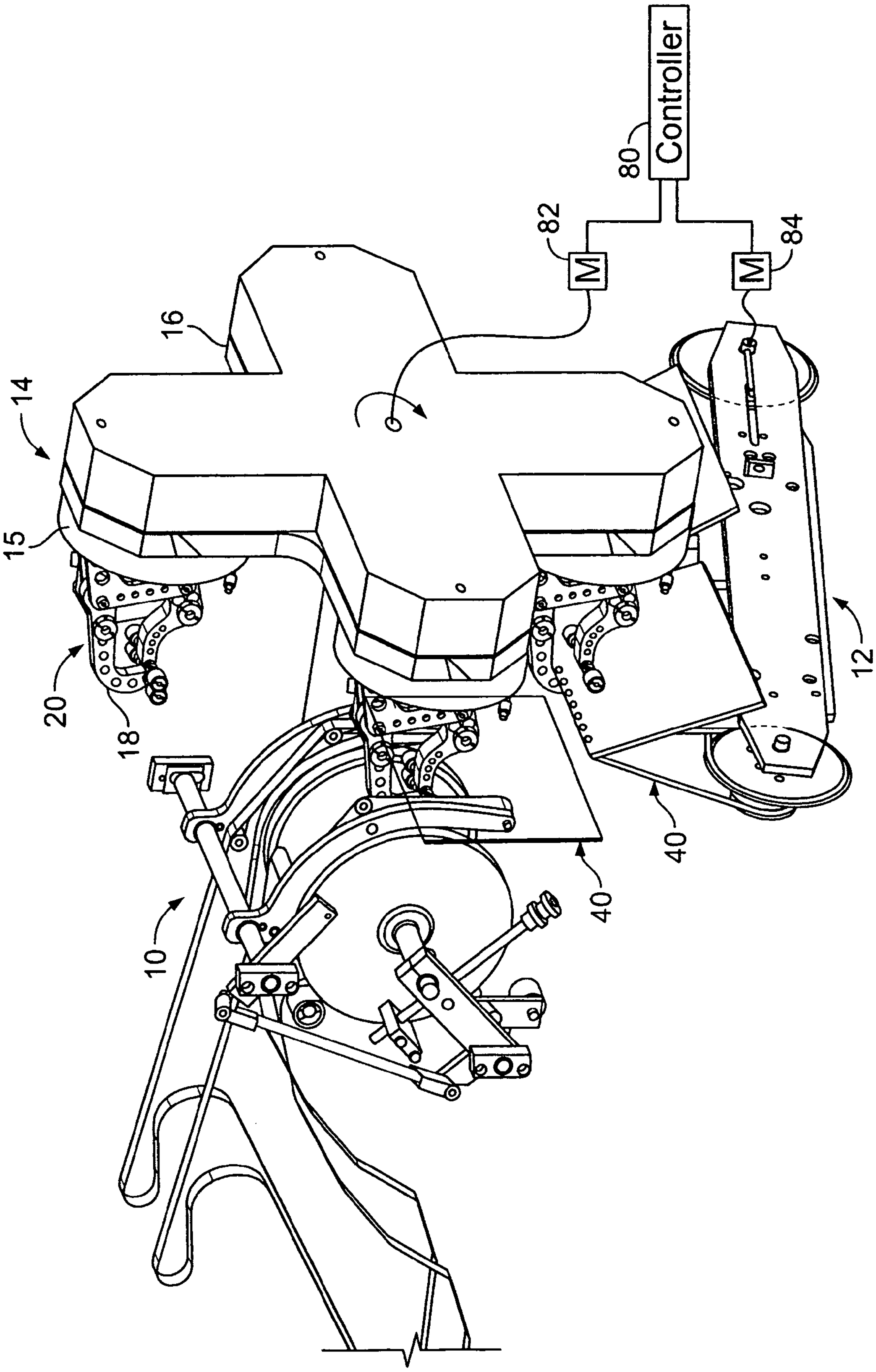
FIG. 1 shows a gripper device according to the present invention.

FIG. 1 shows a preferred embodiment of a gripper device 14 having gripper arms 16 with gripper bases 15. A gripper 20 is mounted on each base 15 in such a way to allow grippers 20 to rotate as gripper device 14 rotates. Thus, grippers 20 maintain an upright position 18 as gripper device 14 rotates clockwise.

As a printed product 40 is transported along an escalator tucker 12, escalator tucker 12 lifts printed product 40 up to be gripped by grippers 20. Gripper device 14 is timed with escalator tucker 12 via a controller 80 controlling individually driven servo motors 82, 84, although the escalator tucker 12 could be geared to gripping device 14 as well. Gripper 20 removes printed product 40 from escalator tucker 12 and delivers printed product 40 to delivery conveyor 10. Delivery conveyor 10 transports printed product 40 further along. Escalator tucker 12 may be similar to the signature transport device disclosed in U.S. Patent Application Publication No. 2005/0225023, hereby incorporated by reference herein.

Figure 2:
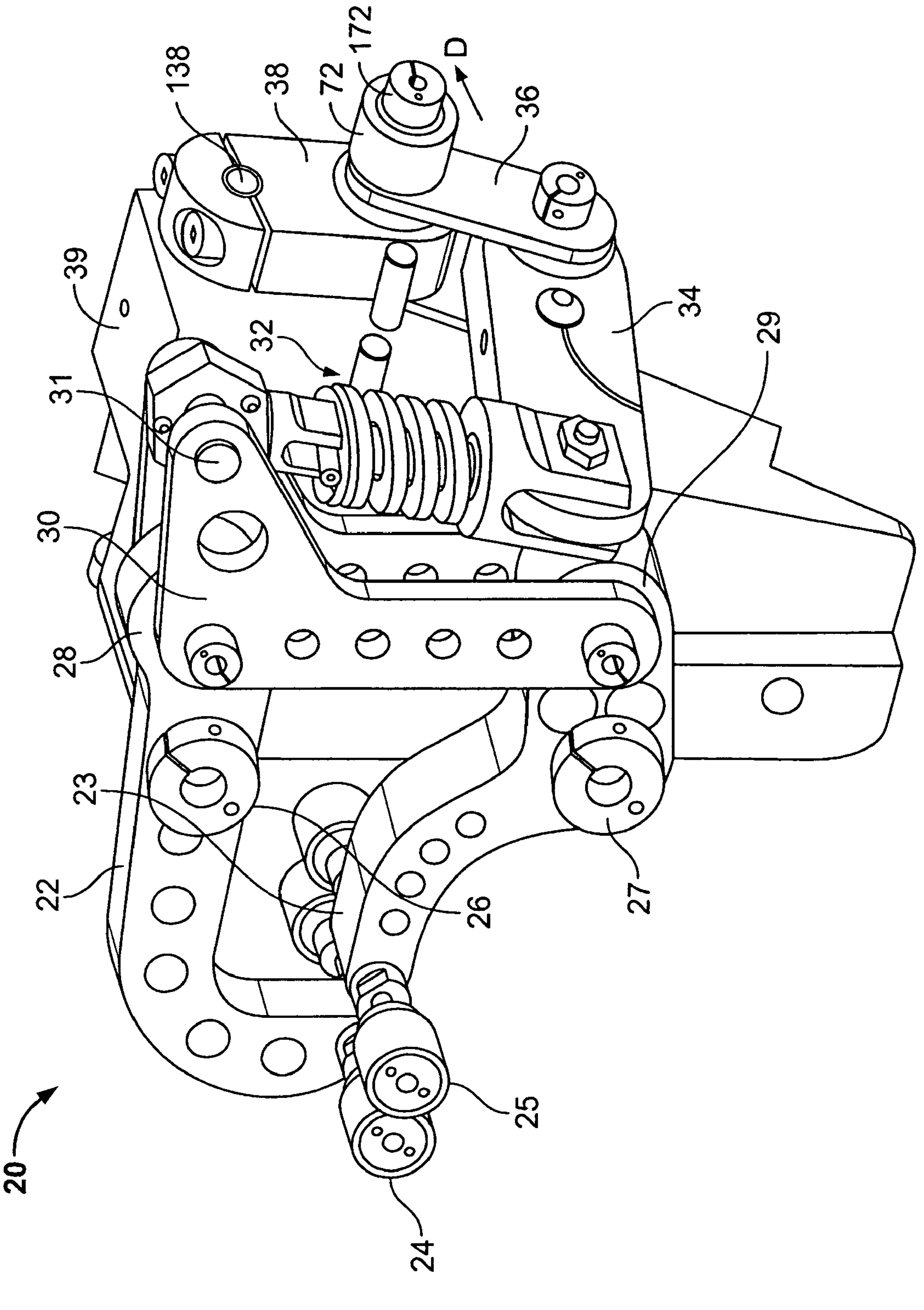
FIG. 2 shows a gripper of the gripping device.

FIG. 2 shows a gripper 20 from gripper device 14. Gripper 20 includes upper arm 22 and lower arm 23 having gripper pads 24, 25 and pivots 26, 27 respectively. One end 28 of upper arm 22 is connected to a coupler link 30, while one end 29 of lower arm 23 is connected to another end of coupler link 30. Coupler link 30 is connected at another end 31 to a spring link 32. Spring link 32 is controlled by the movement of cam follower 72 via links 34 and 36. Link 38 pivotally supports cam follower 72 via a pin 172.

The gripper 20 is spring-loaded in an open position, for example, by a cam spring forcing link 30 downwardly in FIG. 2 by forcing link 38 in a direction D. When cam follower 72 is forced opposite direction D, link 38 moves against the cam spring force rotating about a pivot 138, pushing link 34 via link 36 to counteract the cam spring force and force the entire spring link 32 upwardly. When spring link 32 moves upward, coupler link 30 moves upward and ends 28, 29 are pushed upward. Thus, gripper 20 closes as gripper arms 22, 23 rotate around pivots 26, 27.

Figure 3:
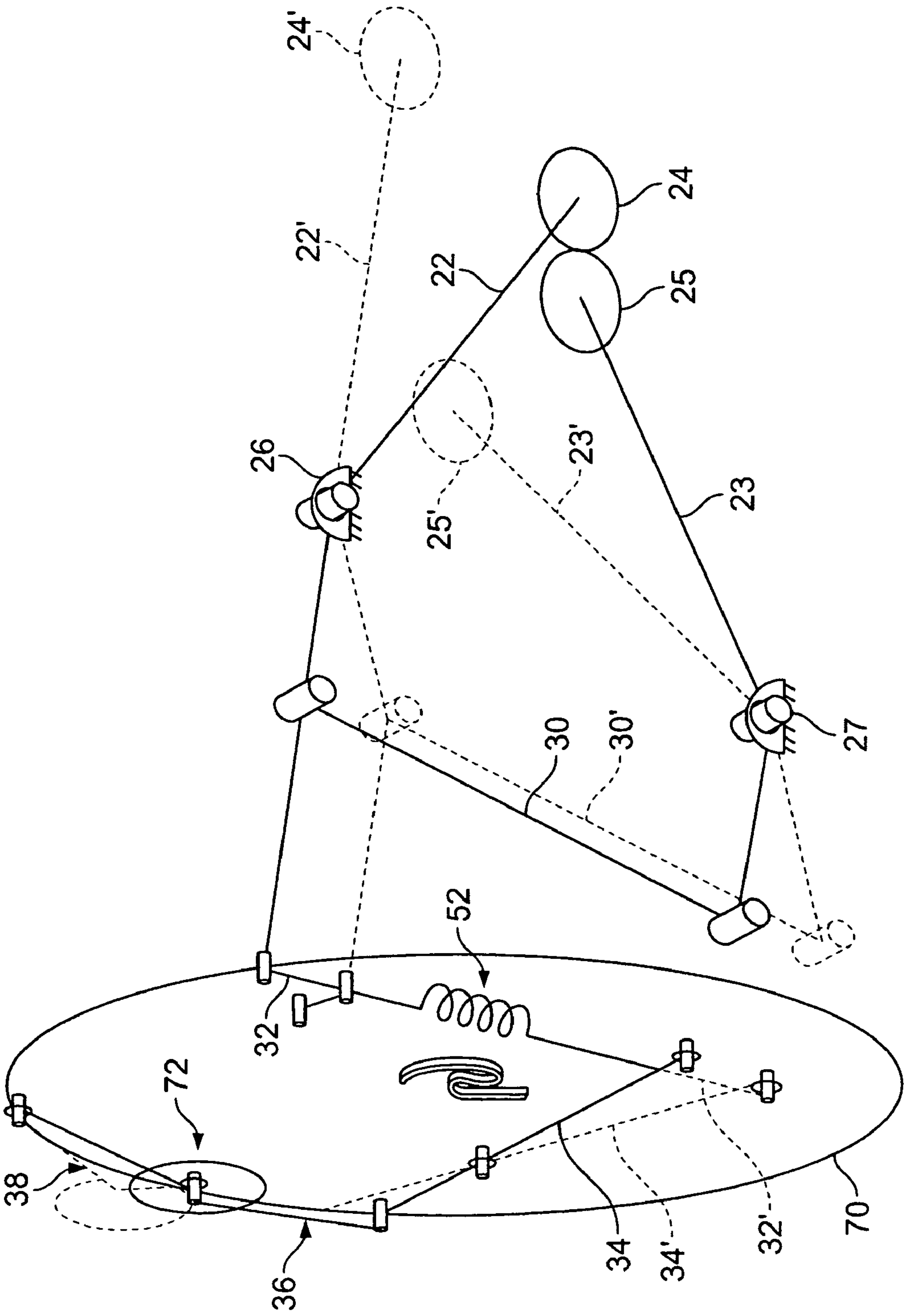
FIG. 3 shows a schematic view of the gripper.

FIG. 3 shows a schematic of the actuation of gripper 20. When gripper 20 is closed, (solid lines, high cam dwell) upper arm 22 with gripper pad 24 is contacting lower arm 23 with gripper pad 25. As cam follower 72 follows cam 70 to a low dwell, links 38, 36, via the cam spring, move causing link 34 to move into position 34'. Link 34 actuates spring link 32, by pulling spring link 32 downward into position 32'. Spring link 32 pulls coupler link 30 downward into position 30' causing upper arm 22 to rotate open around pivot 26 and lower arm 23 to rotate open around pivot 27. Upper arm rotates into position 22' with gripper pad 24' while lower arm rotates into position 23' with gripper pad 25'.

Figure 4A:
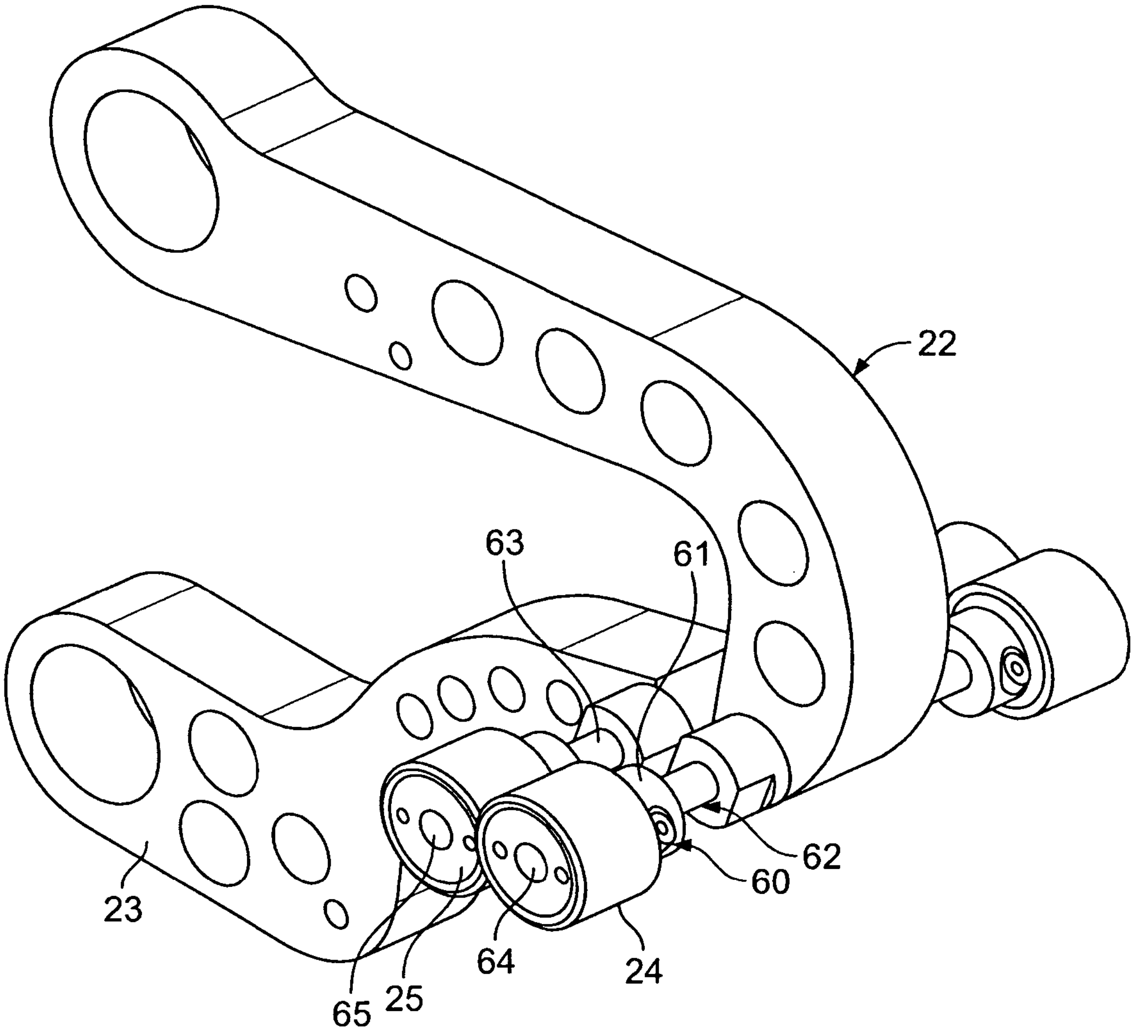
FIG. 4A shows the upper and lower arms of the gripper.

FIG. 4A shows upper arm 22 and lower arm 23. Gripper pads 24, 25 are adjustable and may be covered with a layer of polyurethane, for example. Gripper pads 24, 25 are mounted to upper arm 22 and lower arm 23 via gripper bars 62, 63. Each gripper pad 24, 25 has a bore 64, 65 into which bars 62, 63 fit. Pads 24, 25 can be rotationally fixed to bars 62, 63 via a collar screw 60. The bores 64, 65 may be eccentric to the diameter of gripper pads 24, 25. By loosening collar screws 60, gripper pad supports 61 may be loosened to loosen bores 64, 65 and thus pads 24, 25 may be rotated. This can increase or decrease pressure on products, as the eccentric permits adjustment of the contact location between pads 24, 25. In addition, gripper pads 24, 25 may be coated in a layer of polyurethane, so gripper pads 24, 25 may be rotated to replace worn out sections of polyurethane.

Figure 4B:
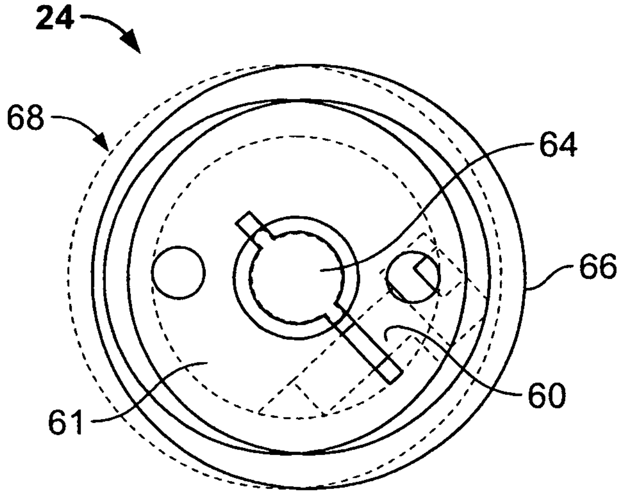
FIG. 4B shows a gripper pad of the gripper.

FIG. 4B shows gripper pad 24. Gripper pad 24 has a bore 64 and a diameter 66. Bore 64 is eccentric with respect to outer diameter 66. Gripper pad 24 may be rotated around bore 64 into position 68 via fixed collar screw 60 thus increasing the amount of pressure applied to printed product 40, since the contact point of gripper pads 24, 25 changes.

What is claimed is:

1. A printed product conveyor comprising:

a plurality of grippers, each gripper including:

a first gripper arm having a first gripper pad; and a second gripper arm having a second gripper pad;

the first gripper pad having a bore and an outer surface being eccentric with respect to the bore, the first and second gripper pads gripping a printed product;

an escalator tucker for lifting the printed product up to be gripped by the grippers, wherein the escalator tucker is geared to the plurality of grippers.

2. The printed product conveyor as recited in claim 1 wherein the first gripper pad is rotated about the bore.

3. The printed product conveyor as recited in claim 2 wherein rotating the first gripper pad increases a pressure applied to the printed product being gripped.

4. The printed product conveyor as recited in claim 2 wherein a contact point of the first gripper pad and the printed product is adjustable by rotating the first gripper pad.

5. The printed product conveyor as recited in claim 1 wherein the first gripper pad or second gripper pad is coated in a layer of polyurethane.

6. The printed product conveyor as recited in claim 1 wherein the first gripper pad or second gripper pad is cylindrical.

7. The printed product conveyor as recited in claim 1 further comprising individually driven servo motors connected to the plurality of grippers and escalator tucker for driving the plurality of grippers and escalator tucker.

8. The printed product conveyor as recited in claim 1 wherein the first gripper arm and second gripper arm are spring-loaded in an open position.

9. The printed product conveyor as recited in claim 1 wherein the plurality of grippers are rotatably mounted on a rotatable gripper base.

10. The printed product conveyor as recited in claim 9 wherein the plurality of grippers remain upright as the gripper base rotates.

11. The printed product conveyor as recited in claim 1 wherein the plurality of grippers are cam activatable grippers.

* * * * *